No. 677,085. Patented June 25, 1901.
C. J. JOHNSON.
VALVE.
(Application filed Jan. 14, 1901.)
(No Model.)
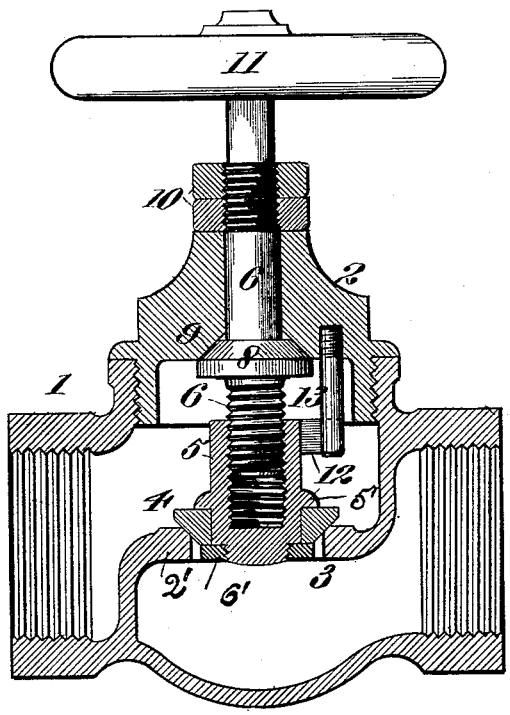
Attest:
Charles Pickles.
Stanley Stoner.
Inventor:
Charles J. Johnson,
By Stanley Stoner
atty.

UNITED STATES PATENT OFFICE.

CHARLES J. JOHNSON, OF ST. LOUIS, MISSOURI.

VALVE.

SPECIFICATION forming part of Letters Patent No. 677,085, dated June 25, 1901.

Application filed January 14, 1901. Serial No. 43,253. (No model.)

*To all whom it may concern:*

Be it known that I, CHARLES J. JOHNSON, a citizen of the United States, residing at St. Louis, State of Missouri, have invented a certain new and useful Improvement in Valves, of which the following is a specification.

My invention relates to that class of valves which are operated by hand, and more particularly to that type in which an upper and a lower valve are employed, both being carried by the one stem. The novelty resides in the peculiarities of construction and the combination and arrangement of parts, all as more fully hereinafter described, shown in the drawing, and then particularly pointed out in the appended claim.

The drawing represents a vertical longitudinal section of the invention.

1 is the housing, into which are adapted to be screwed the inlet and outlet pipes.

2 is the valve-bonnet secured into the housing at right angles to the inlet and outlet openings and which carries all the mechanism.

2' is a diaphragm extending in line with the inlet and outlet openings and provided with a valve-seat 3.

4 is the valve. It is carried by the lower end of a hollow internally-threaded nut 5, which is provided with the lugs or flange 5', between which and the nut 6' on the lower threaded end of the nut 5 the vale is adjustably held, as shown.

6 is a stem threaded on its lower end and engaged in the threaded bore of the nut 5.

8 is a valve on the stem coincident with the seat 9 in the bonnet 2.

10 represents jam-nuts adapted to keep the stem 6 in its proper place.

11 is the hand-wheel by which the valve is operated.

12 is a lateral lug on the nut 5 near its upper end, adapted to receive a pin 13, screwed into the under side of the bonnet 2, preventing lateral movement of the nut, but not preventing its vertical movement on the stem.

It will be readily seen that whether the valve 4 be seated or unseated the pressure within the housing 1 will force the valve 8 to its seat 9 and that the more it is turned the tighter will be the fit by reason of the friction of the parts, and packing or stuffing is not necessary.

What is claimed as new is—

The combination of a housing, a bonnet, a pin screwed into the under side of the bonnet, a lateral lug on the side of a hollow nut and engaging by said pin, a hollow nut having a lateral flange and reduced threaded end and a shoulder, a tapered valve on the said hollow nut below the flange, a nut on the threaded end of the hollow nut and bearing against the under side of the tapered valve and the shoulder of the hollow nut to allow the valve to seat on its seat and the nut to pass through the opening in the diaphragm, a stem threaded into the hollow nut and a valve carried by and rigid with said stem and fitted to a seat in the under side of the said bonnet and adapted to be forced to its seat as the valve-stem is turned to operate the valve carried by its lower end, as set forth.

C. J. JOHNSON.

In presence of—
FIDELIO C. SHARP,
STANLEY STONER.